(12) United States Patent
Lundberg et al.

(10) Patent No.: US 11,256,327 B2
(45) Date of Patent: Feb. 22, 2022

(54) EYE TRACKING DEVICE AND METHOD FOR MANUFACTURNG AN EYE TRACKING DEVICE

(71) Applicant: Tobii AB, Danderyd (SE)

(72) Inventors: Eli Lundberg, Danderyd (SE); Richard Hainzl, Danderyd (SE); Daniel Tornéus, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/440,074

(22) Filed: Jun. 13, 2019

(65) Prior Publication Data

US 2020/0348753 A1   Nov. 5, 2020

(30) Foreign Application Priority Data

Jun. 13, 2018   (SE) .................................... 1850724-4

(51) Int. Cl.
*G09G 5/00*   (2006.01)
*G06F 3/01*   (2006.01)
*G02B 27/01*   (2006.01)

(52) U.S. Cl.
CPC ......... *G06F 3/013* (2013.01); *G02B 27/0172* (2013.01); *G02B 2027/0178* (2013.01)

(58) Field of Classification Search
CPC .. G09G 5/00; G09G 5/08; G06F 3/033; G06F 3/02
See application file for complete search history.

(56) References Cited

U.S. PATENT DOCUMENTS

| 6,299,308 B1 | 10/2001 | Voronka et al. | |
| 2010/0220291 A1 | 9/2010 | Horning et al. | |
| 2010/0289880 A1* | 11/2010 | Moliton | G02B 27/017 348/47 |
| 2012/0021806 A1* | 1/2012 | Maltz | G02B 27/017 455/566 |
| 2013/0113973 A1* | 5/2013 | Miao | G09G 3/003 348/333.01 |
| 2015/0061995 A1 | 3/2015 | Gustafasson | |
| 2018/0376090 A1* | 12/2018 | Liu | H04N 5/378 |

(Continued)

FOREIGN PATENT DOCUMENTS

| EP | 249962 | 9/2012 |
| EP | 2886041 | 6/2015 |

(Continued)

OTHER PUBLICATIONS

Swedish Search Report and Written Opinion of Swedish Patent App. No. 1840724-4, dated Jan. 29, 2019.

(Continued)

*Primary Examiner* — Pegeman Karimi

(74) *Attorney, Agent, or Firm* — Samuel I. Yamron

(57) ABSTRACT

The invention relates to an eye tracking device comprising one or more illuminators, each illuminator comprising a light emitting side, and each illuminator being connected to a first circuitry carrier, an imaging module connected to a second circuitry carrier wherein the image module comprises optical arrangements. The plurality of illuminators, the imaging module and the circuitry carriers are embedded without gaps in a first material. The invention further relates to methods for manufacturing an eye tracking device with over-molded components.

18 Claims, 4 Drawing Sheets

(56) References Cited

U.S. PATENT DOCUMENTS

| | | | |
|---|---|---|---|
| 2019/0197690 A1* | 6/2019 | Kang | G06F 3/013 |
| 2019/0212566 A1* | 7/2019 | Lee | G06F 1/1658 |
| 2020/0012095 A1* | 1/2020 | Edwin | G06F 3/013 |
| 2020/0098997 A1* | 3/2020 | Watabe | H01L 51/0051 |

FOREIGN PATENT DOCUMENTS

| | | |
|---|---|---|
| EP | 3112922 | 1/2017 |
| WO | WO 2018053971 | 3/2017 |
| WO | WO 2018064141 | 4/2018 |

OTHER PUBLICATIONS

EPO Search Report and Written Opinion of EPO Patent App. No. 19179462.7, dated Oct. 16, 2019.

* cited by examiner

EYE TRACKING DEVICE AND METHOD FOR MANUFACTURNG AN EYE TRACKING DEVICE

CROSS-REFERENCE TO RELATED APPLICATION

The present application claims benefit to Swedish patent application No. 1850724-4, filed on Jun. 13, 2018, to Eli Lundberg, Richard Hainzl and Daniel Tornéus, entitled "Eye tracking device and method for manufacturing an eye tracking device", and is hereby incorporated by reference in its entirety.

TECHNICAL FIELD

The present invention relates to a device for eye tracking and a method for manufacturing an eye tracking device. More specifically, the disclosure relates to a device with one or more illuminators and a method according to the introductory parts of claims 1 and 18.

BACKGROUND ART

The illumination solutions in eye tracking devices are in an early stage of development. Many solutions are more or less development kits that are very simple. For device in glasses mechanical carrier rings and a flexible PCB with a number of Light Emitting Diodes (LED) are usually provided. The ring holds the LEDs in the correct position and angles them towards the eye of the user. The flex PCB is attached to the ring with a glue.

More advanced device types use several mechanical plastic parts and one flex PCB. One part may be used for mounting the flex, called Carrier. Another NIR transparent part is used to cover and protect the LEDs on the flex, called LED Cover. Preferably this part is opaque to visible light to make it more attractive esthetically.

The LED cover needs to have good optical properties and there are some design challenges. It is important that it doesn't act like a light guide and it should not cause the light to illuminate the eye though different optical paths. There are tough tolerances on the mechanical parts and assembly to ensure good optical performance and also good esthetical fit. The LED placement have very tight tolerances due to that offset can create either stray light or significantly diminish illumination level and loss of the glint.

In both cases the LED flex can be angled to increase efficiency and also reduce stray light but this makes the assembly process more difficult, possibly requiring human based assembly which increases cost and lowers yield.

There is thus a need for solution that make the assembly easier for large volumes providing precise tolerances. It is also a desire in the industry to enable smaller and more advanced form factors as the eye tracking devices are integrated in small structures as frames for glasses etc. A further problem is that previous solutions have gap between plastic parts causing problems with stray light and imprecise optical properties. Gaps in the assembly are also not esthetically attractive. Previous solutions are also more fragile as glued or mechanically joined parts break easily.

SUMMARY IF THE INVENTION

It is an object to mitigate, alleviate or eliminate one or more of the above-identified deficiencies in the art and disadvantages singly or in any combination and solve at least the above mentioned problem. According to a first aspect there is provided an eye tracking device comprising one or more illuminators, each illuminator comprising a light emitting side, and each illuminator being connected to a first circuitry carrier. An imaging module is connected to a second circuitry carrier, the image module comprises optic arrangements. The plurality of illuminators, the imaging module and the circuitry carriers are embedded without gaps in a first material. This solution provides smaller devices as the assembly is easier to automate. The assembly is also more precise providing less variations in the manufacturing. This solution also provides an eye tracking device that is free from gaps enhancing optical performance and provides better looking and more robust devices. If the first material is transparent to the radiation from the illuminators the illuminators and optionally also the image module may be embedded in the first material.

According to some embodiments the first material comprises openings such that at least one of the light emitting sides of the illuminators and viewing portion of the optic arrangements of the imaging module are not covered by the first material. If the first material is not transparent to the irradiation from the illuminators openings for the illuminators and/or the image module has to be present.

According to some embodiments at least one of the openings of the first material are filled with a second material that is transparent for the light of the illuminators. In this way an integrated window can be created for the illuminator light source and/or imaging module.

According to some embodiments the first material is non-transparent to the illuminator light to stop light from the illuminator to propagate in certain angles. The non-transparent first material also provides a frame for the circuit carrier that visually hides the circuits from the user of the device providing a more attractive design.

According to some embodiments at least the first material is shaped in the form of one of the frames of a pair of glasses so as to provide a device usable for Augmented Reality (AR) applications or Virtual Reality (VR) applications.

According to some embodiments all illuminators are connected to a single first circuitry carrier so as to minimize the number of components.

According to some embodiments the first circuitry carrier and/or the second circuit carrier is a Printed Circuit Board or a 3D molded interconnect devices. According to some embodiments the imaging module is a camera or a lens-less camera or any other imaging device.

According to some embodiments the second circuitry carrier is an integral part of the first circuitry carrier so as to further minimize the number of components of the device.

According to some embodiments the openings are formed as apertures to limit illuminator light emitting angles. This is advantageous in VR applications so that the illuminators do not disturb the eye image due to light going into the lens creating stray light that obfuscate the eye in the image captured by the image module.

According to some embodiments the illuminators are front emitting to maximize light emittance in the frontal direction of the illuminators or side emitting to avoid light emittance in certain directions from the illuminators.

According to some embodiments the first circuitry carrier and/or the second circuitry carrier is flexible to make the automated assembly easier or to enable a flexible design of the eye tracking device.

According to some embodiments the illuminator is a radiation source comprised in the group of: a LED, a laser, an incandescent lamp and a fluorescent material. The smallest, most robust, most energy efficient and cheapest solution is preferably used. A LED is therefore preferred in the current industry but developments in light sources may call for another radiation source. According to some embodiments the illuminators are Near Infrared (NIR) illuminators. This is advantageous as NIR radiation is not visible to the human eye.

According to some embodiments, the second material is transparent to IR light but non-transparent to visible light. In that way the molded windows for the illuminators and/or the image module can be made opaque for the user which provides extra freedom in design possibly making the device more attractive.

According to some embodiments the second material is an optical arrangement so as to enhance the optical properties sin a certain way. It could e.g. be a lens shape to forma positive or negative lens. It may also be a pattern forming a Fresnel lens or any other similar shape giving a lens effect.

According to some embodiments the first material is PMMA, PC, Zeonex or ABS with or without added pigments that are transparent to NIR, and/or the second material is PMMA, PC, Zeonex or ABS with added pigments that are non-transparent to NIR.

According to a second aspect there is provided a method for manufacturing an eye tracking device, comprising the steps of: providing a plurality of illuminator, each illuminator comprising a light emitting side, and each illuminator being connected to a first circuitry carrier, providing an imaging module connected to a second circuitry carrier, the imaging module comprising a lens for capturing images of an eye, embedding the plurality of illuminators, the imaging module and the circuitry carriers without gaps in a first material, wherein the first material comprises openings such that the light emitting sides of the illuminators and the imaging module lens are not covered by first material. Increased yield in production may be achieved due to fewer and simpler steps then in the prior art manufacturing with often manual assembly of mechanical parts. The manufacturing method also enables that it becomes simple to change the design of the eye tracking device using the same PCBs and image module.

According to some embodiments the method further comprises the step of filling at least one of the openings of the first material with a second material that is transparent for the light of the illuminator.

According to some embodiments the step of embedding comprises: providing a first mold, placing the first circuitry carrier and second circuitry carrier in the first mold, filling the empty space of the first mold with the first material. This is a process that is suitable for automated assembly.

According to some embodiments the mold comprises first structures for preventing the first material to cover the light emitting side of the illuminators and a second structure for preventing the first material to cover the imaging module. In that way the first material may be molded without covering the illuminators and imaging module. The second material may then be molded into the empty openings in the first material being a consequence of the illuminators and imaging module previously being covered by the first structures and the second structures.

According to some embodiments, the mold comprises alignment features for aligning the first structures and the second structure with the illuminators and imaging module, respectively. By exactly fixating the first circuitry carrier and second circuitry carrier in the first mold a precise fit is always accomplished so that the components are always placed in the same exact way for every manufactured device.

According to some embodiments the method further comprises the step of filling at least one of the openings with a second material that is transparent for the light form the illuminators.

According to some embodiments, the step of embedding comprises: providing a second mold with empty spaces aligned with the light emitting sides of the illuminators and the viewing portion of the imaging module, placing the first circuitry carrier and second circuitry carrier to the mold, filling the with the second material, such that at least the light emitting sides of the illuminators and the viewing portion of the imaging module are embedded in second material, providing a first mold, placing the first circuitry carrier and second circuitry carrier in the first mold, filling the empty space of the first mold with the first material. In this way the second material, intended to be transparent window to the illuminators, is applied first covering/encapsulating the illuminators and/or the image module. In that way there is no risk of by mistake covering the illuminator and/or image module with the first material that is non-transparent for the radiation from the illuminator(s).

According to a third aspect there is provided a method for manufacturing an eye tracking device according to the device described above, wherein the first material is placed using a 3D-printer.

According to a fourth aspect there is provided a method for manufacturing an eye tracking device according to the device described above, wherein the first material and/or the second material is placed using a 3D-printer.

According to some embodiments, the method further comprises the step of polishing the surface of the illuminators and/or imaging module so as to remove non-transparent material from illuminator surface and/or accomplish a polished optically equal surface.

Effects and features of the second, third and fourth aspects are largely analogous to those described above in connection with the first aspect. Embodiments mentioned in relation to the first aspect are largely compatible with the second aspect, third, and fourth aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided as examples to convey the scope of the invention to the skilled person.

Figure 1A:
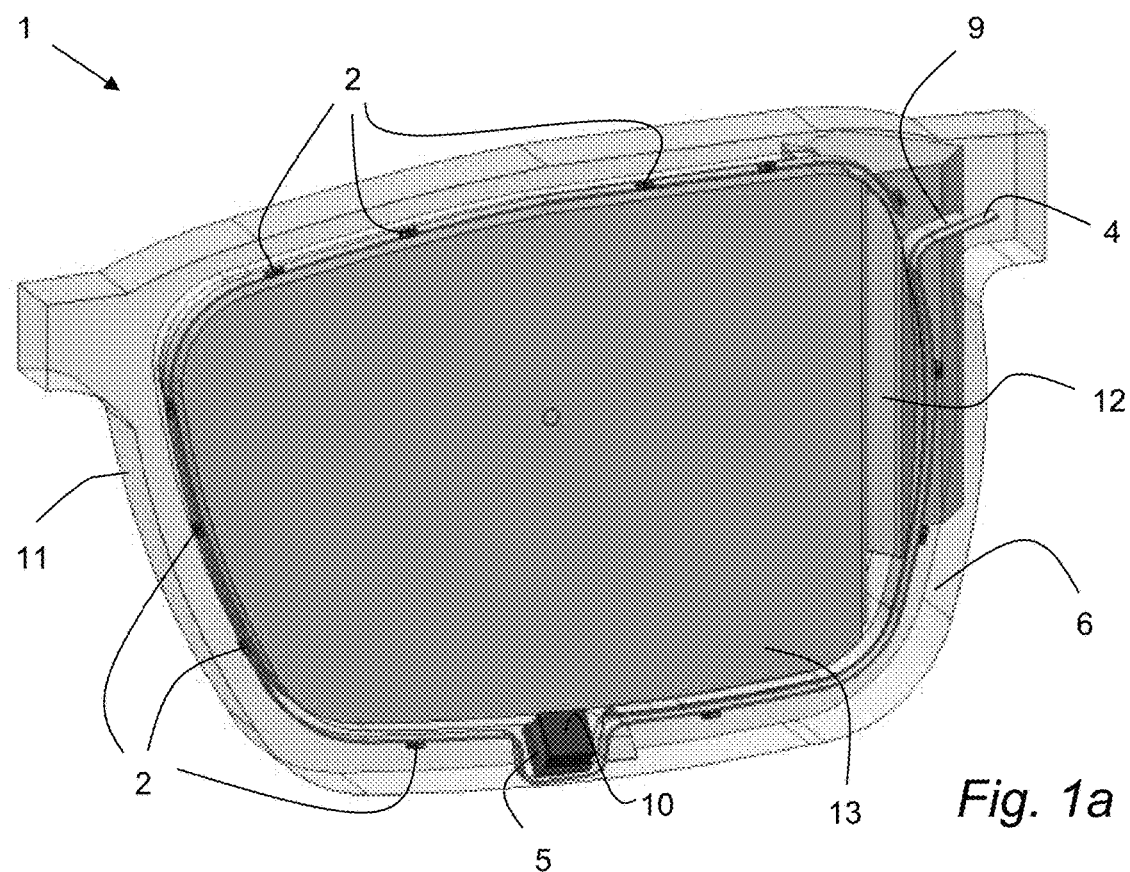
FIG. 1a is a perspective view of an eye tracking device integrated in a frame of a pair of glasses where the first material is transparent.

FIG. 1a shows an eye tracking device 1 integrated into a frame 11 of a pair of glasses. Only one of the frame for the right eye is shown. The eye tracking device comprises one or more illuminators 2, each illuminator 2 comprising a light emitting side 3, and each illuminator being connected to a first circuitry carrier 4. An imaging module 5 is connected to a second circuitry carrier 9 and the image module 5 comprises optic arrangements 10. The plurality of illuminators 2, the imaging module 5 and the circuitry carriers 4, 9 are embedded without gaps in a first material 6. The first material comprises openings 7 such that at least one of the light emitting sides of the illuminators and viewing portion 10 of the optic arrangements of the imaging module 5 are not covered by the first material 6. In FIG. 1a the first material 6 is transparent. All illuminators 2 are in this embodiment side emitting and connected to a single first circuitry carrier 4. The first circuitry carrier 4 and/or the second circuit carrier 9 may be a Printed Circuit Board PCB or a 3D molded interconnect devices 3D-MIDs.

Figure 1B:
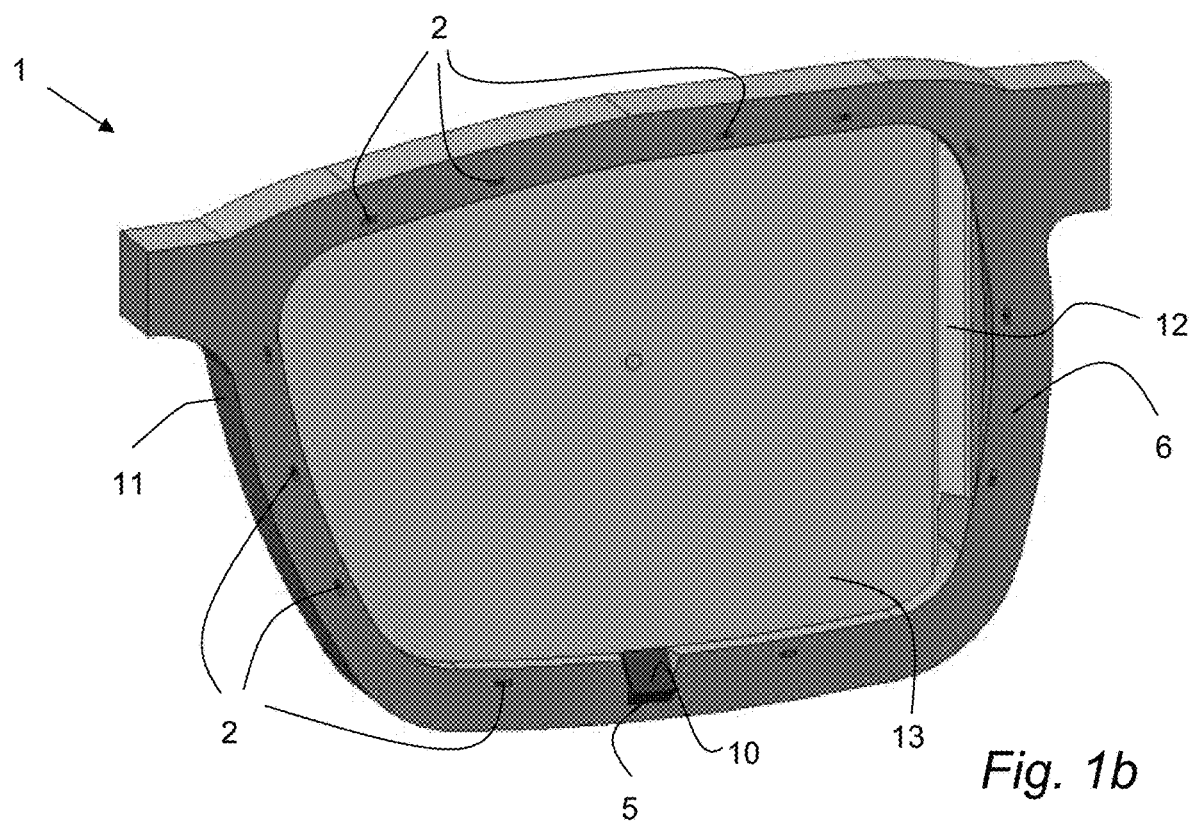
FIG. 1b is a perspective view of an eye tracking device integrated in a frame of a pair of glasses where the first material is non-transparent.

FIG. 1b shows the same eye tracking device 1 integrated into a frame 11 of a pair of glasses as in FIG. 1a where the first material 6 is non-transparent, at least to visible light. It could however be transparent for light from illuminators irradiating in NIR. In cases where the frame of the glasses has no openings, the first material 6 may be transparent for light from illuminators irradiating in NIR but non-transparent for visible light. If the openings 7 are filled with the second material, the second material must be transparent for light from illuminators. In that case the transparent properties of the first material are only important if the openings also should work as apertures for the illuminator light.

The imaging module 5 in the embodiment of FIGS. 1a and 1b is a camera, but it could be a lens-less camera or any other image module capable of capturing the image of reflected illuminator(s) 2 in the eye of a user.

The second circuitry carrier 9 in FIG. 1a could in another embodiment (not shown) be an integral part of the first circuitry carrier 4.

Figure 2:
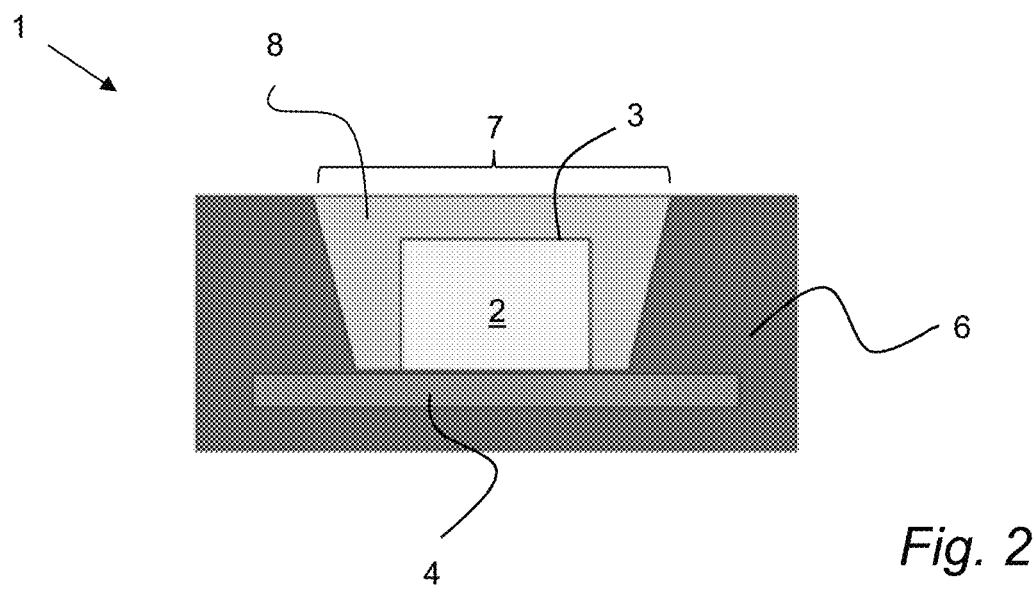
FIG. 2 is a schematic view of an over-molded illuminator LED with first material and second material.

FIG. 2 is a schematic view of how the openings of the first material 6 are filled with a second material 8 that is transparent for the light of the illuminators. The first material is in this embodiment non-transparent to the illuminator light to shield and define possible illumination angles of the illuminator 2. The opening 7 thus form an aperture to limit illuminator light emitting angles. This is especially important for VR applications.

In FIGS. 1a, 1b, 2 and 3 the illuminator is a LED. The illuminator could however be a laser, an incandescent lamp, a fluorescent material or any other light source suitable to fit into the device. The illuminators are Near Infrared (NIR) illuminators to not be visible to the user and the image module thereby has to be able to capture images in NIR images.

In FIG. 2 the second material 8 is an optic arrangement functioning as a window for the LED. According to a different embodiment optic arrangement built up by the second material 8 can be lens-shaped or shaped as a Fresnel lens.

Figure 3:
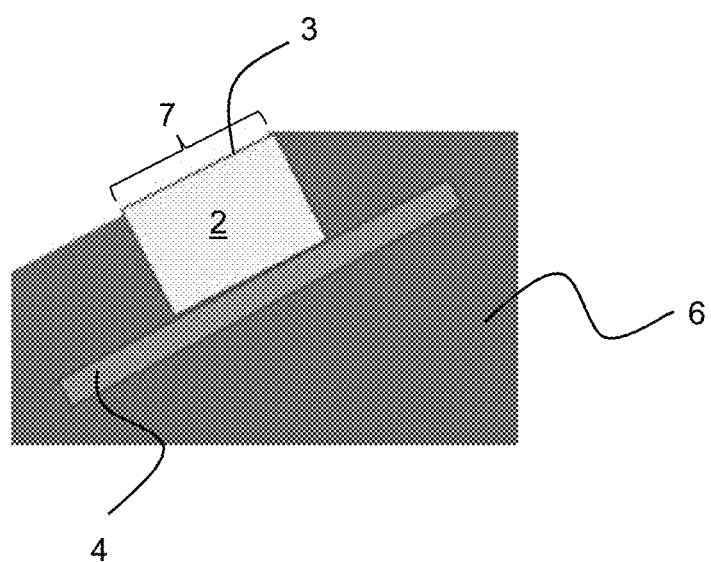
FIG. 3 is a schematic view of an over-molded illuminator LED with only first material.

FIG. 3 shows an embodiment without an optic arrangement or second material. The illuminator is a LED having its illuminating side 3 un-covered towards the environment. The LED top material is the preferably durable as e.g. PMMA. If softer LED top material is used as silico or epoxy the embodiment of FIG. 2 is preferred where the LED is covered by the second material 8.

Figure 4:
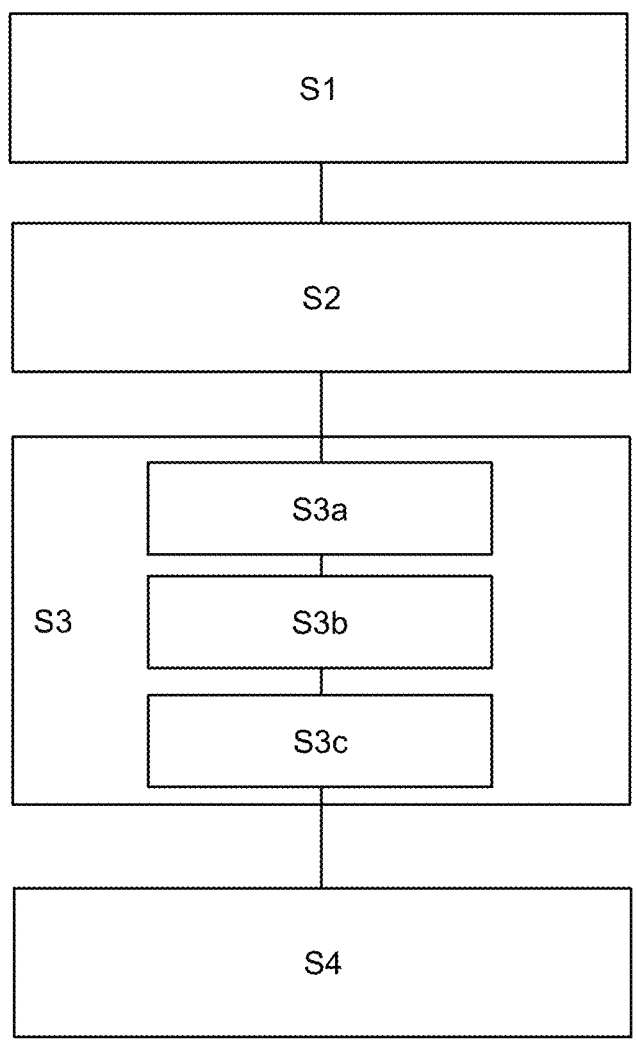
FIG. 4 is a box diagram showing a first method for manufacturing an eye tracking device.

FIG. 4 illustrates a method for manufacturing an eye tracking device, comprising the steps S1 providing a plurality of illuminator, each illuminator comprising a light emitting side, and each illuminator being connected to a first circuitry carrier, S2 providing an imaging module connected to a second circuitry carrier, the imaging module comprising a lens for capturing images of an eye, S3 embedding the plurality of illuminators, the imaging module and the circuitry carriers without gaps in a first material, wherein the first material comprises openings such that the light emitting sides of the illuminators and the imaging module lens are not covered by first material. The embodiment further comprises the step of S4 filling at least one of the openings of the first material with a second material that is transparent for the light of the illuminator. The step of embedding S3 comprises: S3a providing a first mold, S3b placing the first circuitry carrier and second circuitry carrier in the first mold, S3c filling the empty space of the first mold with the first material.

Figure 5:
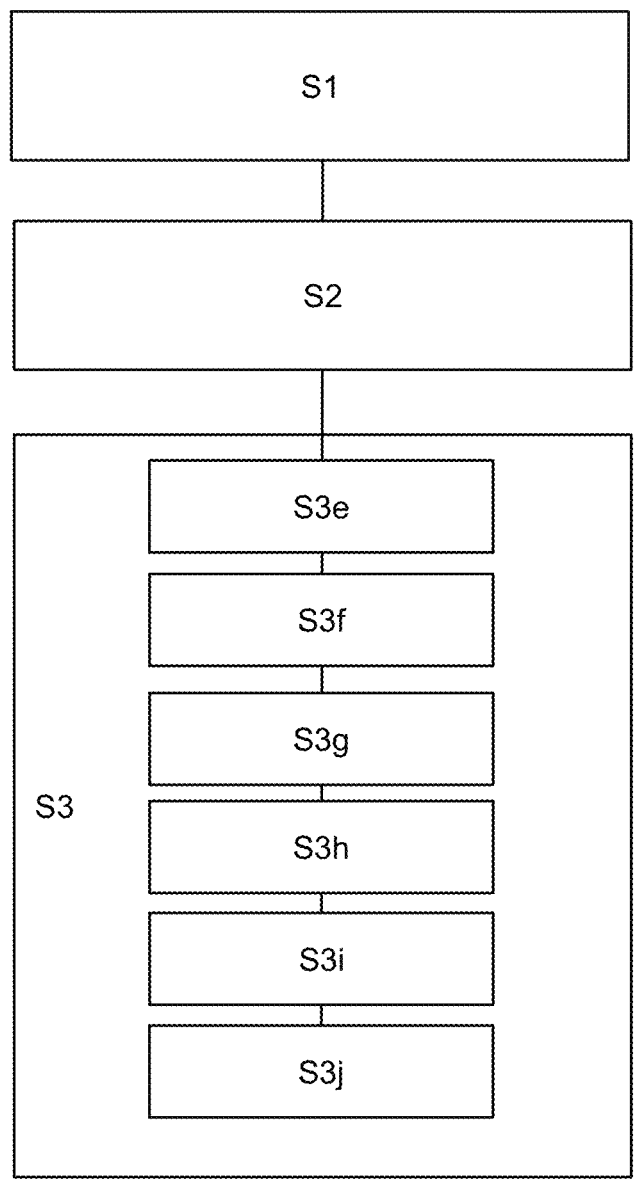
FIG. 5 is a box diagram showing a second method for manufacturing an eye tracking device.

FIG. 5 illustrates another embodiment of a method for manufacturing an eye tracking device, comprising the steps S1 providing a plurality of illuminator, each illuminator comprising a light emitting side, and each illuminator being connected to a first circuitry carrier, S2 providing an imaging module connected to a second circuitry carrier, the imaging module comprising a lens for capturing images of an eye, S3 embedding the plurality of illuminators, the imaging module and the circuitry carriers without gaps in a first material, wherein the first material comprises openings such that the light emitting sides of the illuminators and the imaging module lens are not covered by first material. The step of embedding comprises S3e providing a second mold with empty spaces aligned with the light emitting sides of the illuminators and the viewing portion of the imaging module, S3f placing the first circuitry carrier and second circuitry carrier to the mold, S3g filling the with the second material, such that at least the light emitting sides of the illuminators and the viewing portion of the imaging module are embedded in second material, S3h providing a first mold, S3i placing the first circuitry carrier and second circuitry carrier in the first mold, S3j filling the empty space of the first mold with the first material.

The person skilled in the art realizes that the present invention by no means is limited to the preferred embodiments described above. On the contrary, many modifications and variations are possible within the scope of the appended claims. For example, even though not shown in the Figures, the second material may be shaped to a lens, a Fresnel lens or any other light guiding structure. The surfaces may be polished to enhance optical properties or remove unwanted material in a manufacturing step.

Additionally, variations to the disclosed embodiments can be understood and effected by the skilled person in practicing the claimed invention, from a study of the drawings, the disclosure, and the appended claims.

The invention claimed is:

1. An eye tracking device comprising:
   one or more illuminators, each illuminator comprising a light emitting side, and each illuminator being connected to a first circuitry carrier,
   an imaging module connected to a second circuitry carrier, the imaging module comprising optical arrangements,
   wherein the plurality of illuminators, the imaging module and the first and second circuitry carriers are embedded without gaps in a first material,
   wherein the first material comprises openings such that at least one of the light emitting sides of the illuminators and viewing portion of the optical arrangements of the imaging module are not covered by the first material, and wherein at least one of the openings of the first material are filled with a second material that is transparent for the light of the illuminators.

2. The eye tracking device according to claim 1, wherein the first material is non-transparent to the illuminator light and the second material is transparent to IR light but non-transparent to visible light.

3. The eye tracking device according to claim 1, wherein all illuminators (2) are connected to a single first circuitry carrier (4).

4. The eye tracking device according to claim 1, wherein the first circuitry carrier or the second circuitry carrier is a Printed Circuit Board (PCB) or a 3D molded interconnect devices (3D-MIDs).

5. The eye tracking device according to claim 4, wherein the second circuitry carrier is an integral part of the first circuitry carrier.

6. The eye tracking device according to claim 1, wherein the imaging module is a module comprised in the group of: a camera, a lens-less camera.

7. The eye tracking device according to claim 1, wherein the openings are formed as apertures to limit illuminator light emitting angles.

8. The eye tracking device according to claim 1, wherein the illuminators are front emitting to maximize light emittance in the frontal direction of the illuminators or side emitting to avoid light emittance in certain directions from the illuminators.

9. The eye tracking device according to claim 1, wherein the illuminators are Near Infrared (NIR) illuminators and the illuminators are a radiation source comprised in the group of: an LED, a laser, an incandescent lamp and a fluorescent material.

10. The eye tracking device according to claim 1, wherein the second material is an optic arrangement.

11. The eye tracking device according to claim 1, wherein the first material is PMMA, PC, Zeonex or ABS with or without added pigments that are transparent to NIR, and/or the second material is PMMA, PC, Zeonex or ABS with added pigments that are non-transparent to NIR.

12. The eye tracking device according to claim 1, wherein the first circuitry carrier and/or the second circuitry carrier is flexible.

13. A method for manufacturing an eye tracking device, comprising the steps of:
   providing a plurality of illuminator, each illuminator comprising a light emitting side, and each illuminator being connected to a first circuitry carrier,
   providing an imaging module connected to a second circuitry carrier, the imaging module comprising a lens for capturing images of an eye,
   embedding the plurality of illuminators, the imaging module and the circuitry carriers without gaps in a first material, wherein the first material comprises openings such that the light emitting sides of the illuminators and the imaging module lens are not covered by first material,
   further comprising the step of filling at least one of the openings of the first material with a second material that is transparent for the light of the illuminator.

14. The method for manufacturing an eye tracking device according to claim 13, wherein the step of embedding comprises:
   providing a first mold,
   placing the first circuitry carrier and second circuitry carrier in the first mold,
   filling the empty space of the first mold with the first material.

15. The method for manufacturing an eye tracking device according to claim 14, wherein the mold comprises first structures for preventing the first material from covering the light emitting side of the illuminators and a second structure for preventing the first material from covering the imaging module.

16. The method for manufacturing an eye tracking device according to claim 15, wherein the mold comprises alignment features for aligning the first structures and the second structure with the illuminators and imaging module, respectively.

17. The method for manufacturing an eye tracking device according to claim 16, wherein the step of embedding comprises:
   providing a second mold with empty spaces aligned with the light emitting sides of the illuminators and the viewing portion of the imaging module,
   placing the first circuitry carrier and second circuitry carrier to the mold,
   filling the mold with the second material, such that at least the light emitting sides of the illuminators and the viewing portion of the imaging module are embedded in second material,
   providing a first mold,
   placing the first circuitry carrier and second circuitry carrier in the first mold, filling the empty space of the first mold with the first material.

18. The method for manufacturing an eye tracking device according to claim 13, wherein the first circuitry carrier and/or the second circuitry carrier is flexible.

* * * * *